3,118,808
APPARATUS FOR SHAPING AND COMPRESSING ON A MOULD SHEETS OF PLASTIC MATERIAL, PARTICULARLY ASBESTOS CEMENT
Giorgio Marchioli, Via G.B. Morgagni 22, and Giuseppe Gremigni, Via Lomellina 52, both of Milan, Italy
Filed July 6, 1961, Ser. No. 122,149
3 Claims. (Cl. 162—402)

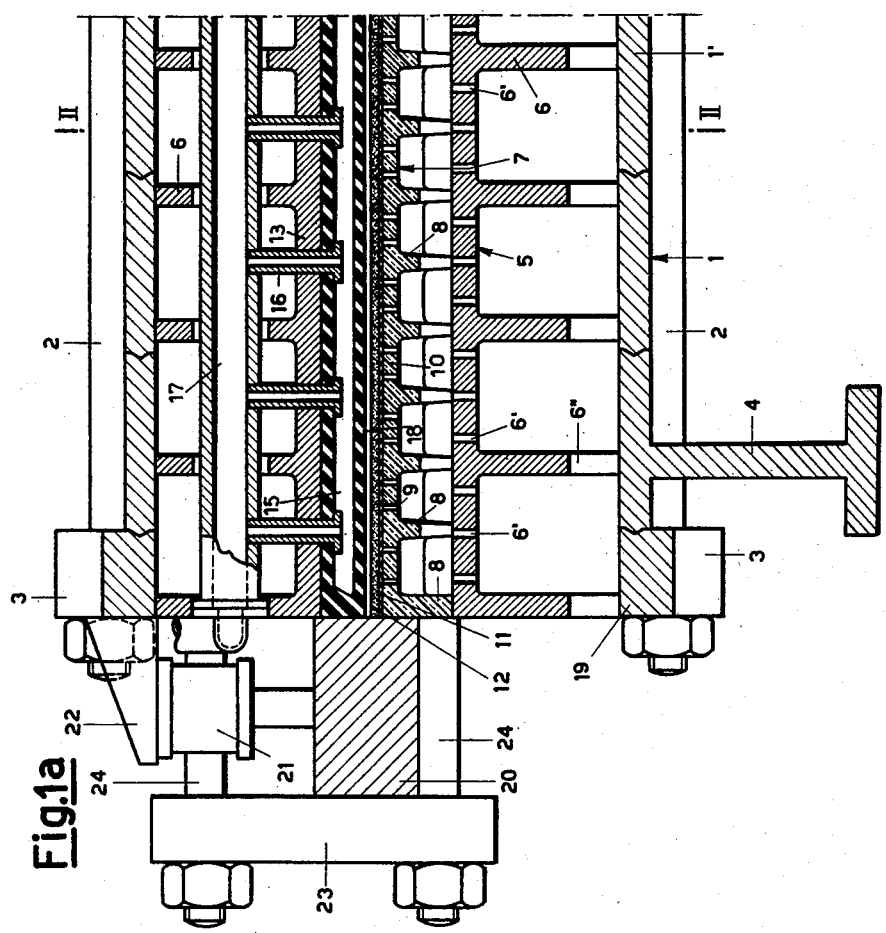

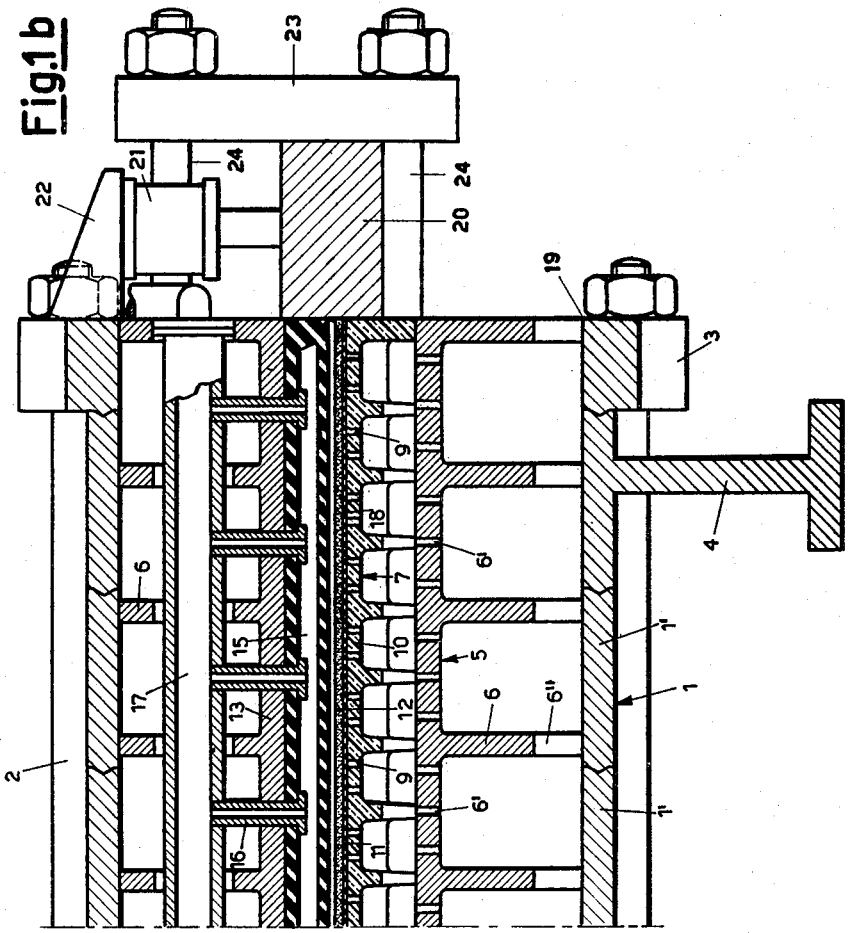

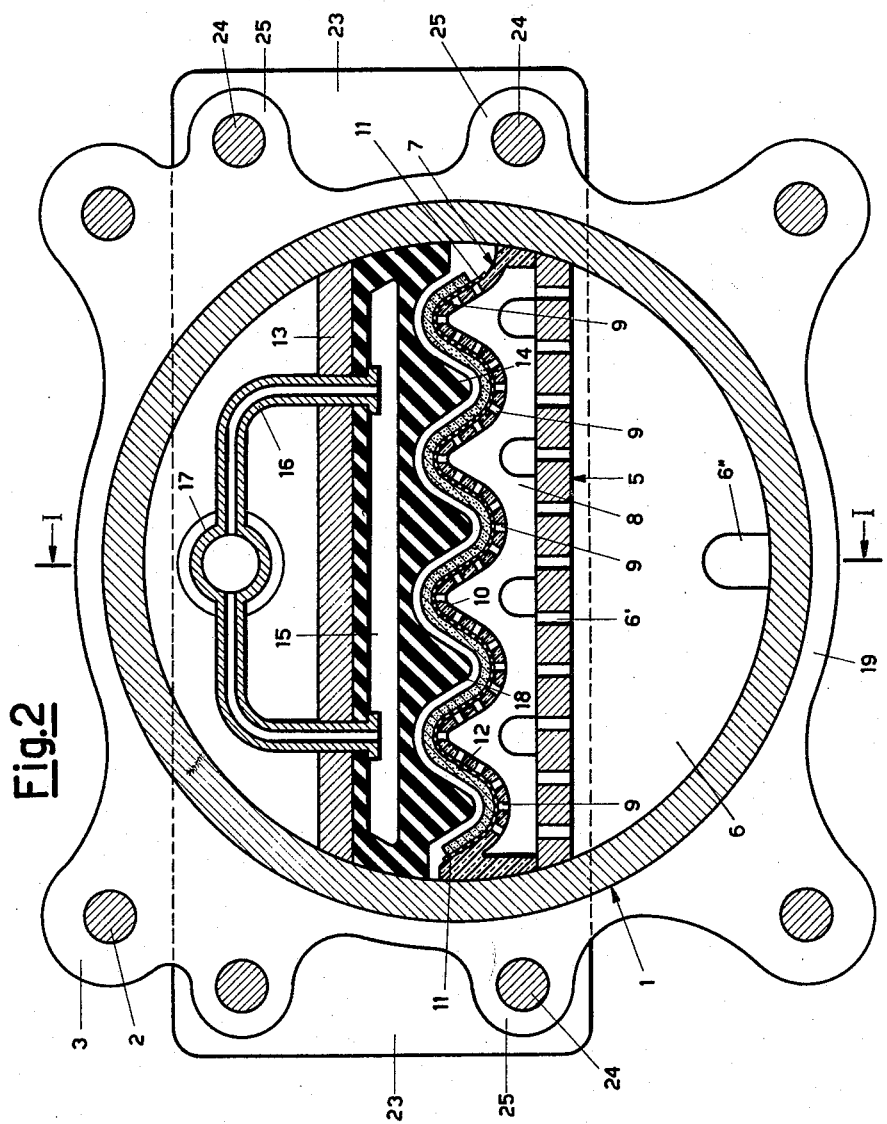

The present invention relates to an apparatus for shaping and compressing on a mould sheets of plastic material, particularly asbestos cement.

As is known, corrugated or otherwise shaped sheets of plastic material composed of a mixture of cement and asbestos, are obtained by allowing a moist sheet or leaf, which is obtained by causing a fluid mixture of cement, asbestos and water contained in a tank to be deposited on and adhere to a rotating drum dipping into the tank, to dry out between matching corrugated or otherwise shaped moulds. After more or less drying out between the moulds, the sheet then assumes the shape of the moulds.

This known manufacturing process, besides being costly on account of the great length of time required, does not give completely satisfactory results as the shaped members are not homogeneous, because of the rigidity of the moulds and the inevitable unevenness of the mixture. The lack of uniformity is particularly noted in their compactness, hardness, moisture content and the like, so that the moulded members are fragile and of uneven thickness, at least in some portions thereof.

An object of the present invention is to provide an apparatus which overcomes these and other drawbacks, and said apparatus is essentially characterized in that it comprises an inflatable body and a mould lying therebelow, both of which are enclosed within a rigid tubular body.

More specifically, the apparatus according to the invention comprises a rigid tubular body containing a lower support for a mould and for the sheet on the latter and an upper support for an inflatable body adapted to press the material disposed on said mould against the latter, and the upper and lower supports define spaced apart, parallel plane surfaces extending chordally across the body or housing.

The apparatus according to the invention further comprises means for opposing the expansion of said inflatable body axially out of the ends of the tubular body.

The above, and other objects, features and advantages of the invention, will be apparent in the following detailed description of an illustrative embodiment thereof which is to be read in connection with the accompanying drawings wherein:

FIGS. 1a and 1b together constitute a vertical longitudinal section of the apparatus according to the invention, taken along the line I—I of FIG. 2, and FIG. 2 is a transverse sectional view taken along the line II—II of FIG. 1.

Referring to the drawings in detail, it will be seen that the apparatus includes a tubular body 1 which can be of one-piece construction or, as in the example illustrated, formed of a plurality of ring-like segments 1' fitted snugly together and kept axially together by means of longitudinal struts or tie-rods 2. The rods 2 have threaded end portions extending through lugs or ears 3 formed on end walls 19 of the tubular body 1 and receiving nuts for holding the body in its assembled condition. Further, certain of the segments 1' have depending feet 4 for supporting the body 1. On the inside of body 1 there is a chordally extending support table 5 having perforations 6' and depending webs 6 of segmental shape fitting closely against the inner surface of body 1 and having bottom cut-outs 6". A rigid metal mould 7 rests on table 5 and has perforations 9 and supporting webs 8. At the top of mould 7 there are longitudinal undulations 10 whereon the sheet 12 to be moulded lies above a grating or screen 11.

The upper part of body 1 is provided with a support 13 extending chordally thereacross and to which there is fixed an inflatable body 14 of elastically yielding material such as natural or synthetic rubber. The body 14 has an internal chamber 15 which is in liquid-tight communication with tubes 16 leading to a manifold 17 for supplying air or other compressed fluid into chamber 15.

It is apparent that chamber 15 could, for constructional reasons, be sub-divided into a plurality of chambers, and that the inflatable body 14 could be made up of a plurality of inflatable bodies each having its own internal chamber.

The bottom surface of body 14 is formed with undulations 18 which have a profile matching that of undulations 10 of the underlying mould 7.

The mould 7 can be longitudinally withdrawn from an end of body 1 to facilitate the placement of the sheet or leaf 12 thereon in the plastic state. After the loaded mould is returned to body 1, chamber 15 is pressurized, so that body 14 will exert a uniform pressure on sheet 12. Such pressure will assuredly be uniform because of the elastic nature of the material of which body 14 is made, and, by evenly distributing the pressure and adjusting itself to any differences in thickness or hardness in the sheet (which, however slight, may still exist), the sheet is made equally compact in all its points and at the same time substantially all the water of the mixture is forcibly removed from the sheet, thus giving rapidly and reliably, a perfect finished product.

The water which, as stated hereinabove, escapes from the compressed sheet, passes through holes 9 and 6' and is collected in the bottom of body 1 for passage through the cutouts 6" of webs 6 to the outside of the body.

In order to oppose the expansion of body 14 in an axial direction as a result of the pressure introduced into chamber 15, sturdy closing members 20 extend across the end walls 19, and can be shifted vertically upward from the illustrated positions so as to allow mould 7 to be loaded into and unloaded from body 1. Such movement of closing members 20 is effected by means of pistons hydraulically actuated within cylinders 21 carried by brackets 22 integral with end walls 19. The closing members 20 are guided in their vertical motion between end walls 19 and outwardly spaced plates 23 carried by bolts 24 mounted on tabs 25 formed on the periphery of end walls 19. Although only one embodiment of the apparatus according to the invention has been described and illustrated herein, it is apparent that numerous constructional modifications thereof are possible without thereby departing from the scope or spirit of the invention as defined in the appended claims.

We claim:
1. An apparatus for compressing corrugated sheets of cement-asbestos comprising
   (A) a tubular, cylindrical housing of one-piece construction in planes perpendicular to the longitudinal axis of the housing,
   (B) rigid upper and lower supports of segmental cross-sectional shape fitting closely in said housing against the inner surface of the latter and having spaced apart, parallel plane surfaces extending chordally across the housing and between which openings are defined at the opposite ends of the housing,
   (C) a rigid mould slidable on said plane surface of the lower support for insertion into, and removal from said housing through one of said end openings and also fitting closely in said housing, said mould having a contoured upper surface with longitudinally extending undulations corresponding to the corrugations of the cement-asbestos sheet to be compressed thereon, (D) a hollow inflatable body suspended from said upper support and having a plane upper surface engaging said plane surface of the upper support and a contoured lower surface with longitudinally extending undulations also corresponding to the corrugations of the cement-asbestos sheet to be compressed against said mould, (E) means for introducing fluid under pressure into the interior of said hollow body to inflate the latter between said plane surface of the upper support and a corrugated cement-asbestos sheet on said mould so that the sheet is strongly compressed between said contoured upper and lower surfaces of the mould and inflatable body, respectively, (F) a closing member for each end opening of the housing, said closing member being in the form of an elongated block extending across the adjacent end of the housing and being movable vertically relative to the latter, guide means rigidly secured to said adjacent end of the housing and preventing movement of the closing member away from the housing, the vertical dimension of said block forming the closing member being at least as large as the distance from said plane surface of the upper support to the tops of the undulations of said upper surface of the mould, and (G) means operative to move each closing member between a raised position, where the adjacent end opening is exposed sufficiently to permit the insertion and removal of said mould with a corrugated sheet thereon, and a lowered position, where said closing member completely confines the adjacent end of said inflatable body to limit longitudinal expansion of the latter during strong compressing of a sheet on the mould.

2. An apparatus as in claim 1; wherein said tubular housing includes
(1) an axially arranged series of rings,
(2) end pieces at the opposite ends of said series of rings, and
(3) axially extending struts engaging said end pieces for drawing the latter toward each other and thereby axially holding together said rings therebetween.

3. An apparatus as in claim 2; wherein said guide means are constituted by end plates, and bolts rigidly supporting said end plates from said end pieces of the housing in parallel spaced relation thereto.

References Cited in the file of this patent

UNITED STATES PATENTS

| | | |
|---|---|---|
| 1,209,308 | Lanhoffer | Dec. 19, 1916 |
| 2,048,253 | Freyssinet | July 21, 1936 |
| 2,122,083 | Boudin et al. | July 28, 1938 |
| 2,730,783 | Kennison | Jan. 17, 1956 |
| 2,865,078 | Hasselblad | Dec. 23, 1958 |
| 2,913,798 | Breguet | Nov. 23, 1959 |
| 2,975,476 | Burke | Mar. 21, 1961 |
| 2,990,314 | Leitzel | June 27, 1961 |